(12) United States Patent
Burgos

(10) Patent No.: US 6,673,213 B2
(45) Date of Patent: Jan. 6, 2004

(54) METHOD AND APPARATUS FOR THE THERMO-SOLAR DISTILLATION AND TRANSPORTATION OF WATER FROM A WATER TABLE

(76) Inventor: Victor Miguel Hernandez Burgos, Calle Mercader, No. 6 Colonia Campestre La Rosita 27250, Torren, State of Coahuila (MX)

( * ) Notice: Subject to any disclaimer, the term of this patent is extended or adjusted under 35 U.S.C. 154(b) by 82 days.

(21) Appl. No.: 09/923,226

(22) Filed: Aug. 6, 2001

(65) Prior Publication Data

US 2003/0024802 A1 Feb. 6, 2003

(51) Int. Cl.[7] .............................. B01D 3/02; F24V 2/12
(52) U.S. Cl. ......................... 203/10; 203/22; 203/100; 203/DIG. 1; 202/185.1; 202/234; 159/903; 159/DIG. 40; 126/569
(58) Field of Search ............................. 203/10, DIG. 1, 203/DIG. 17, 150, 22, 234, 185.1; 159/903, DIG. 40; 126/569, 48.2

(56) References Cited

U.S. PATENT DOCUMENTS

| | | | | |
|---|---|---|---|---|
| 2,636,129 A | * | 4/1953 | Agnew | 126/639 |
| 3,490,996 A | * | 1/1970 | Kelly | 202/185.1 |
| 3,965,683 A | * | 6/1976 | Dix | 203/10 |
| 3,998,206 A | * | 12/1976 | Jahn | 126/578 |
| 4,172,766 A | * | 10/1979 | Laing et al. | 202/173 |
| 4,318,781 A | * | 3/1982 | Iida | 202/173 |
| 4,323,052 A | * | 4/1982 | Stark | 126/571 |
| 4,373,996 A | * | 2/1983 | Maruko | 202/173 |
| 5,281,310 A | * | 1/1994 | Djelouah et al. | 126/635 |
| 5,650,050 A | * | 7/1997 | Kaufmann | 159/903 |
| 6,391,162 B1 | * | 5/2002 | Kamiya et al. | 203/11 |

* cited by examiner

*Primary Examiner*—Virginia Manoharan
(74) *Attorney, Agent, or Firm*—Bachman & LaPointe, P.C.

(57) ABSTRACT

The invention refers to a simultaneous system for the distillation and elevation of water on top of the water table itself, which driven by thermo solar energy allows in an autonomous operation the generation of electrical power through transportation and free fall of water.

4 Claims, 3 Drawing Sheets

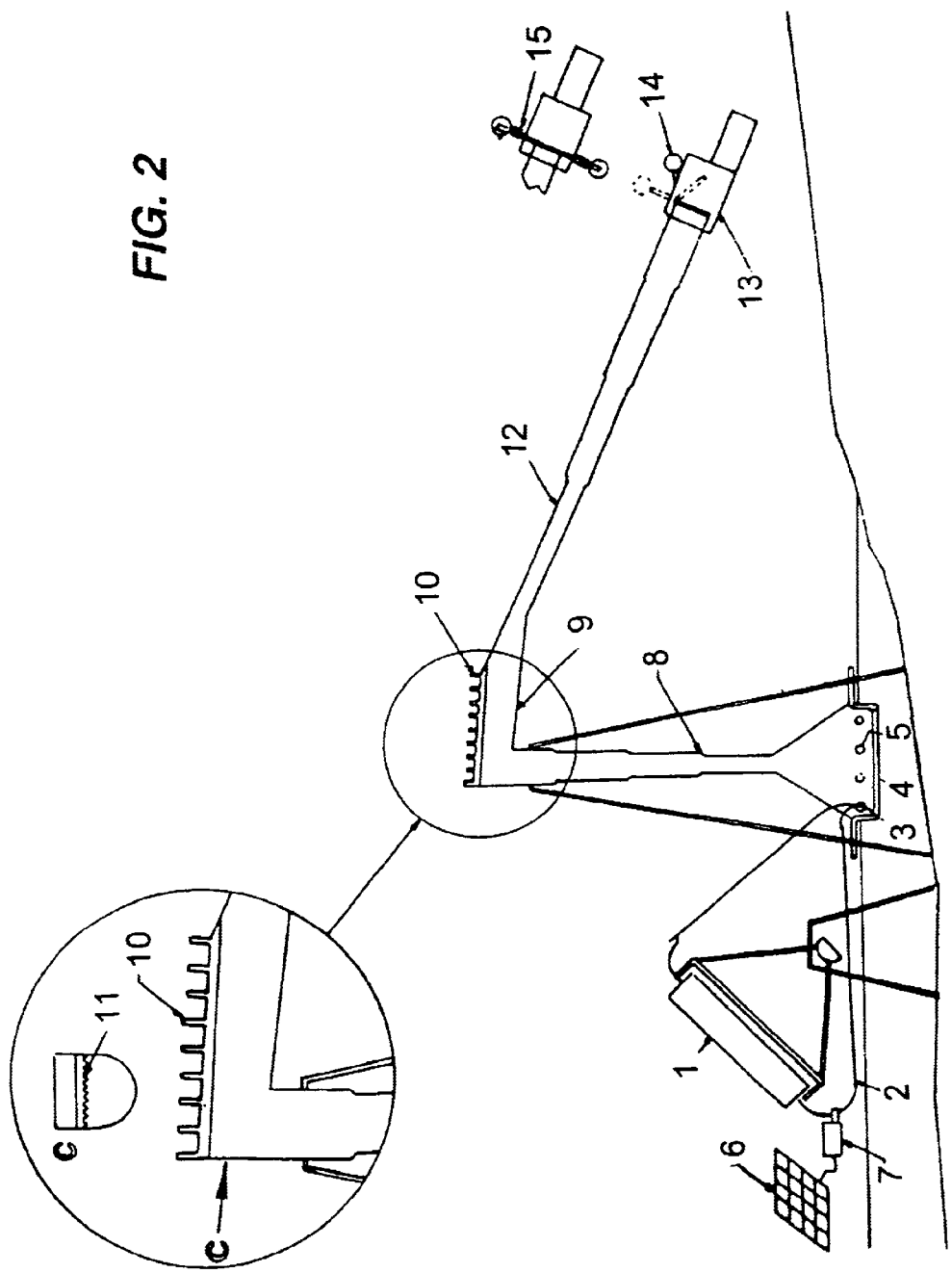

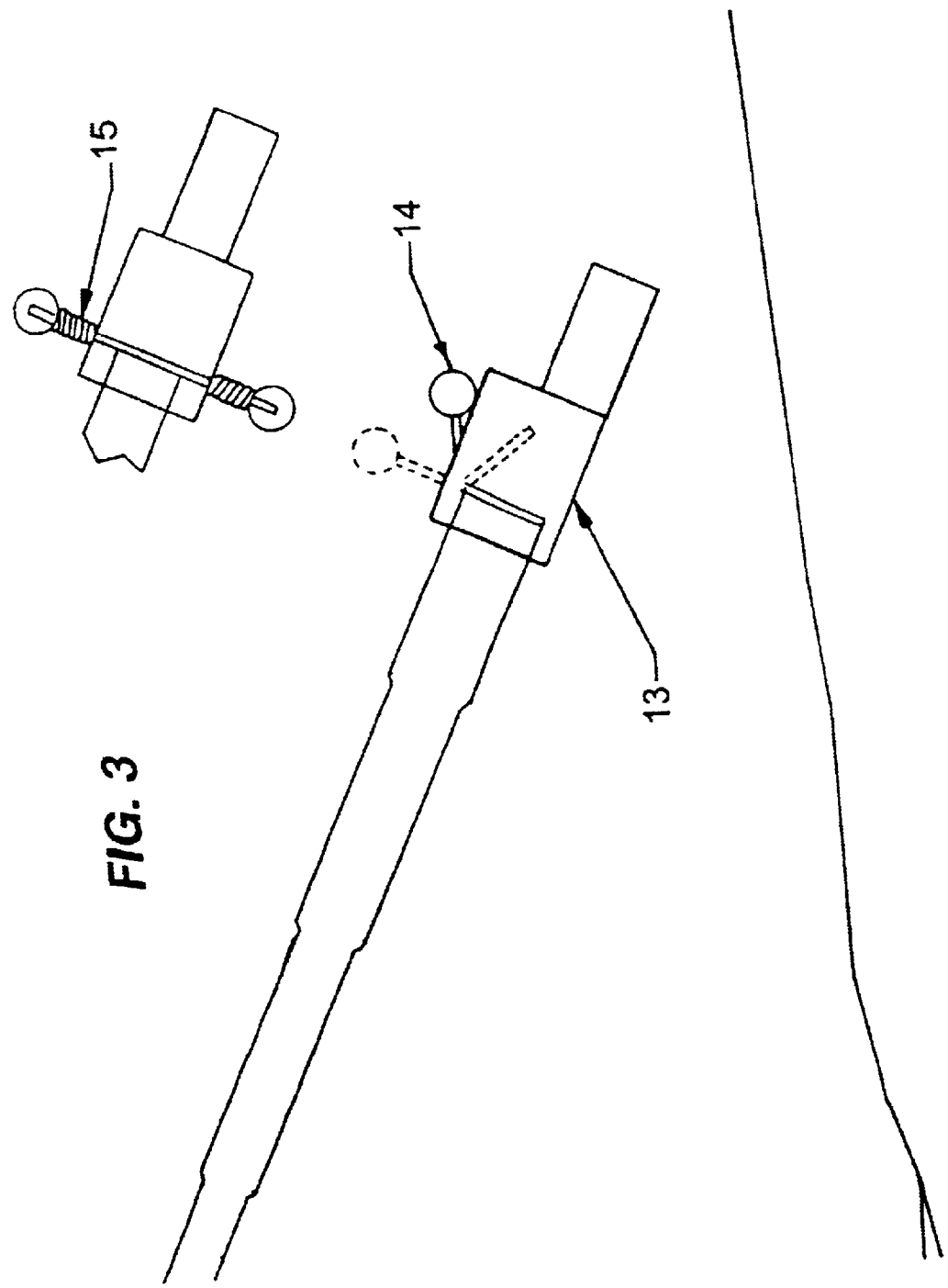

METHOD AND APPARATUS FOR THE THERMO-SOLAR DISTILLATION AND TRANSPORTATION OF WATER FROM A WATER TABLE

BACKGROUND OF THE INVENTION

The present invention refers to a novel method designed to obtain water by means of thermo-solar evaporation, and condensing and transporting this water to a place distant, be it for the use of the water itself or for the generation of electric power.

The problem of furnishing water for domestic as well as for industrial use is widely known; the shortage of water for land and cattle farming purposes is also critical.

Due to this systems have been developed in order to transport water to the sites where it is needed, or recourse to the perforation of wells is taken in order to extract water from the subsoil. Known water transportation systems are highly expensive and in most cases prohibitive for the above purposes; on the other hand, extraction of water from the subsoil is not always successful, this without considering the cost of the necessary energy and the fact that the tables are being depleted.

In the light of this it is highly desirable to find an effective and economical way of obtaining water, and also transporting it at reasonable prices.

An object of the present invention is to furnish a method which allows the evaporation of water from a water table, be it fresh water or salt water, by using solar energy.

A further object of the invention is to furnish an apparatus for the transportation of the once condensed water obtained by the above method, if necessary over considerable distances which may include rough terrain. The invention also covers the possibility of generating electricity by means of free falling water.

SUMMARY OF THE INVENTION

Other uses, objects and advantages of this invention will be self-evident or will be specified in the following detailed description of the invention.

Basically the invention comprises the concentration of solar rays by way of solar thermal energy collectors of the parabolic channel type (eventually elliptical or circular) which, upon receipt of the sun rays concentrate them at the focal point producing high temperatures; at the focal point there is located a tube through which circulating oil continues to flow through a coil which is submerged under a thin water layer of a table; as a result of the high temperature achieved in the coil the water boils and evaporates.

In the coil a constant temperature is maintained by forcing the circulation of oil through the coil by means of an electrically operated hydraulic pump. This electrical pump runs on electric power produced by photovoltaic cells; the necessary connections are furnished in order for the hot oil to reach the coil and apply on the water the maximum temperature concentrated by means of the sun ray collector, thus producing the evaporation of the water at the pressure required for it to rise to a preset height in a rising tower.

A continuous rising capacity of the water vapor is achieved if the temperature in the rising tower is maintained as well as by constantly increasing the flow area, which relieves the vapor flow by reducing frictional losses.

Condensation of the water vapor is achieved by shock and refrigeration of the water vapor as it hits a cover or ceiling wherein are furnished cooling fins or any other heat dissipating means, and canals where the vapor condenses and can be collected. The canals are designed so as to allow for easy formation and runoff of droplets. The cover or ceiling is manufactured of a material having good thermal conductive properties which allows for a more rapid dissipation of heat and can be manufactured, e.g., of aluminum.

The water in the top part of the tower is caused to descend through a pipeline of proper dimensions as regards the vapor volume being fed; the pipeline will be laid so that it forms a descending slope which allows a water flow to build up by gravity, producing a vacuum which enhances circulation and further suction of vapor. There also will be siphons installed along the pipeline, which in spite of topographic conditions allow the water to flow even over small elevations or mounds due to the effect of the law governing the continuity of matter (rising of water in canals).

From the above readings it will become evident to a person of skill in the art that it is possible to generate electric power taking advantage of the water falls in order to drive hydraulic turbines as many times as the topography will allow for it, or even better, to drive water directly up in order to have it fall for the use in the generation of electrical power, that is to say, to directly feed power generating plants, furnishing afterwards the water for whatever other use(s) it may be needed.

The procedure of evaporation, elevation and transportation of the water may be repeated as many times as it is deemed necessary in order to transport water through valleys and mountains.

BRIEF DESCRIPTION OF THE DRAWINGS

Following the invention will be illustrated by a way of a preferred embodiment of same which only is to be considered as a non limiting example, since several variations and embodiments may be thought of without departing from the spirit and coverage of the invention, which shall be considered in its more ample in no way limiting sense.

In the accompanying drawing:

FIG. 2 shows the plant of FIG. 1 in which the vapor rising tower has been included, and FIG. 3 shows in particular a trap which allows for the selective opening of a cover.

In FIGS. 1 through 3 same reference numbers are used for equal or corresponding parts, for a better understanding of the present invention.

DETAILED DESCRIPTION

Figure 1:
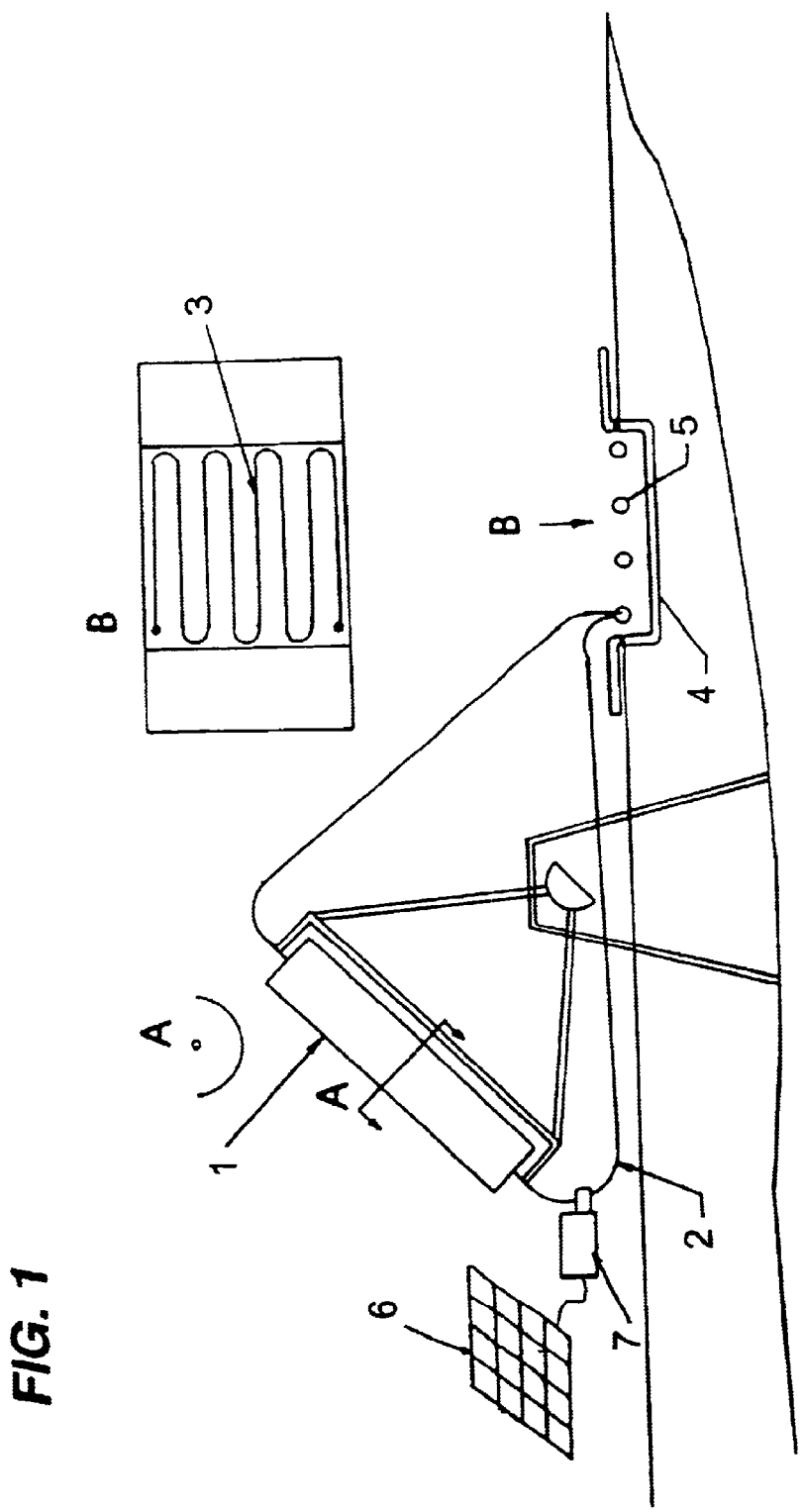
FIG. 1 shows a sectional side view of a water distilling plant built according to the present invention.

With reference to the figures and in particular to FIG. 1, there is shown a solar thermal energy collector (1) which concentrates the solar energy harnessed in the focal point consisting of a pipe (2) through which flows the hot fluid (oil), the pipe being connected to a coil (3) located inside a vat (4) submerged in a water table; in the vat (4) there are furnished holes (5) at a height preset to maintain in the inside a water level sufficient to replenish the water which boils and evaporates. There is also included a photovoltaic cell panel (6) which furnishes the electrical power to drive the pump (7) which keeps the fluid flowing from the collector to the coil and back again to the collector in order to be reheated.

FIG. 2 shows the vapor rising tower (8) in which there are furnished enlargements distributed to expand and relieve the flow area, thus bringing about the acceleration of the flow of vapor; in the top part, as high as will be dictated by the soil conditions and necessities and by the transport requirements, there is located the cooling cover (9) (in the shape of an inverted boot) which on its outside is furnished with ventilating or heat dissipating fins (10), and on its underside has (v shaped) grooves (11) which facilitate the accumulation of vapor, thus bringing about water condensation and runoff through thermal shock of the vapor on hand in the ceiling; this cover (9) has a slanted position which allows for the drops of already condensed water to slide down a descending pipeline (12); the flow area or diameter of the descending pipeline (12) shows a constant increase which favors the flow of water by reducing frictional losses and increasing the volume of moving water, which in turn will cause a larger flow of rising vapor due to the velocity of the fluid current, thus facilitating and accelerating the system's operation.

FIG. 3 finally illustrates a trap (13) comprising a counterweight (14) which only allows for the trap (13) to open until the tower is fully loaded, so as to only cause a flow and thus the real build up of a vacuum to occur when the pipeline is completely full, which will promote the fluidity of the vapor; the trap's (13) or cover's counterweight (14) acts in combination with a spring (15) in order to bring about a closure as soon as there is a lack of water flow.

The materials used will of course be selected according to their intended function; the vat, for instance, will be made of a material or comprise a lining which isolates water, so as not to loose thermal energy because of the temperature prevailing in the water table, and also intended for a longer service life in spite of the effects of corrosion; it is obvious that it must be possible to dismantle the vat in order to allow for it to be replaced when necessary, due to the accumulation of salts or scaling. The tower will be made of thermal materials and painted in dark colors so as to promote the absorption of sun rays while reflecting a minimum of heat, in order to preserve the heat necessary for the vapor to rise and thus act like a chimney. Also the shape of the various elements may vary; the tubular pipeline may be cylindrical, square or hexagonal, etc.; the trap may be placed off center, or may have the same configuration as the pipeline; it is also possible to use elements or devices serving the same purpose or even add some which may improve the harnessing of solar energy, e.g. a sun tracking system, etc., all of which has been considered by the inventor.

What is claimed is:

1. A method of solar distillation comprises:

providing a closed loop conduit which has a first portion which is in heat exchange relationship with a collector for harnessing solar energy and a second portion which is in heat exchange relationship with a naturally fed water source;

pumping fluid through the conduit wherein the fluid is heated in the first portion of the conduit and cooled in the second portion of the conduit wherein water in the water source is vaporized by the heated fluid;

positioning a tower over at least a portion of the water source for collecting the vapor; and condensing the vapor in the tower and feeding the condensed water from the tower along a downwardly inclined slopes.

2. A method according to claim 1, including a solar power pump for circulating the fluid in the conduit.

3. A solar distillation system comprising: a closed loop conduit having a first portion which passes through a collector for harnessing solar energy in heat exchange relationship therewith and a second portion which is submerged in a vat of water, said collector comprises solar parabolic channel energy collectors which concentrate the solar energy on a focal point;

a pump associated with the conduit for pumping a fluid around the closed loop conduit, said pump being driven by a motor powered by photovoltaic cells;

a tower positioned over the vat for collecting vapor rising from the vat, the tower including a sealing plate furnished with cooling fins for condensing the collected vapor, and a pipeline for transporting the condensed vapor along a descending slope.

4. An apparatus according to claim 3, wherein the tower has a shape which converges in the direction of the rising vapor and wherein a trap is located at the bottom of the descending slope and includes means for opening and closing the trap upon the collection of a desired quantity of water.

* * * * *